(12) United States Patent
Pitt

(10) Patent No.: US 11,946,517 B2
(45) Date of Patent: Apr. 2, 2024

(54) BRAKE SHOE GUIDE IMPROVEMENTS

(71) Applicant: Ken Pitt, Hartley (AU)

(72) Inventor: Ken Pitt, Hartley (AU)

( * ) Notice: Subject to any disclaimer, the term of this patent is extended or adjusted under 35 U.S.C. 154(b) by 196 days.

(21) Appl. No.: 17/295,786

(22) PCT Filed: Nov. 21, 2019

(86) PCT No.: PCT/AU2019/000146
§ 371 (c)(1),
(2) Date: May 20, 2021

(87) PCT Pub. No.: WO2020/102844
PCT Pub. Date: May 28, 2020

(65) Prior Publication Data
US 2022/0003285 A1    Jan. 6, 2022

(30) Foreign Application Priority Data

Nov. 21, 2018 (AU) .............................. 2018904439
Dec. 6, 2018 (AU) .............................. 2018904637

(51) Int. Cl.
*F16D 65/09* (2006.01)
*F16D 65/22* (2006.01)
(Continued)

(52) U.S. Cl.
CPC ............ *F16D 65/09* (2013.01); *F16D 65/22* (2013.01); *F16D 2121/08* (2013.01); *F16D 2125/30* (2013.01)

(58) Field of Classification Search
CPC ............................ F16D 65/09; F16D 2121/08
See application file for complete search history.

(56) References Cited

U.S. PATENT DOCUMENTS 2,781,868 A * 2/1957 House .................. F16D 51/22
74/569
3,650,360 A * 3/1972 King .................... F16D 65/08
188/250 C
(Continued)

FOREIGN PATENT DOCUMENTS

CN    102979836 A    3/2013
EP    0096466 A1 * 12/1983
(Continued)

OTHER PUBLICATIONS

International Search Report dated Feb. 3, 2020, issued in corresponding International Application No. PCT/AU2019/000146, filed Nov. 21, 2019, 5 pages.
(Continued)

*Primary Examiner* — Melody M Burch
(74) *Attorney, Agent, or Firm* — Christensen O'Connor Johnson Kindness PLLC

(57) ABSTRACT

A heavy vehicle drum brake shoe guide and an assembly comprising the brake shoe guide are described. In one aspect, there is provided a brake shoe guide for attachment to a drum brake shoe by a pin fastener, to prevent brake shoe misalignment. There is also provided a brake shoe guide assembly including at least a brake shoe guide and a pin fastener for securing the brake shoe guide to a drum brake shoe. The brake shoe guide described herein is simple to fit to a standard, off the shelf brake shoe, and can be retrofitable to a brake shoe and/or brake assembly. Moreover, the brake shoe guide assembly described herein can retain the cam follower roller to the brake shoe, and act as an axle for the cam follower roller, eliminating the need for a separate retainer clip. Further still, the guide and the assembly of which it forms a part can be used with drums of various sizes.

19 Claims, 11 Drawing Sheets

(51) Int. Cl.
    *F16D 121/08*     (2012.01)
    *F16D 125/30*     (2012.01)

(56) References Cited

U.S. PATENT DOCUMENTS

| | | |
|---|---|---|
| 4,150,736 A | 4/1979 | Marti |
| 5,443,135 A | 8/1995 | Redgrave |
| 2004/0245059 A1 | 12/2004 | Maehara et al. |

FOREIGN PATENT DOCUMENTS

| | | |
|---|---|---|
| GB | 345248 A | 3/1931 |
| GB | 1396473 A | 6/1975 |
| GB | 2013800 A | 8/1979 |
| WO | 2018/094441 A1 | 5/2018 |

OTHER PUBLICATIONS

Written Opinion of the International Searching Authority dated Feb. 3, 2020, issued in corresponding International Application No. PCT/AU2019/000146, filed Nov. 21, 2019, 5 pages.

Office Action dated Oct. 11, 2022, issued in corresponding Chinese Application No. 201980003824.5, 8 pages.

\* cited by examiner

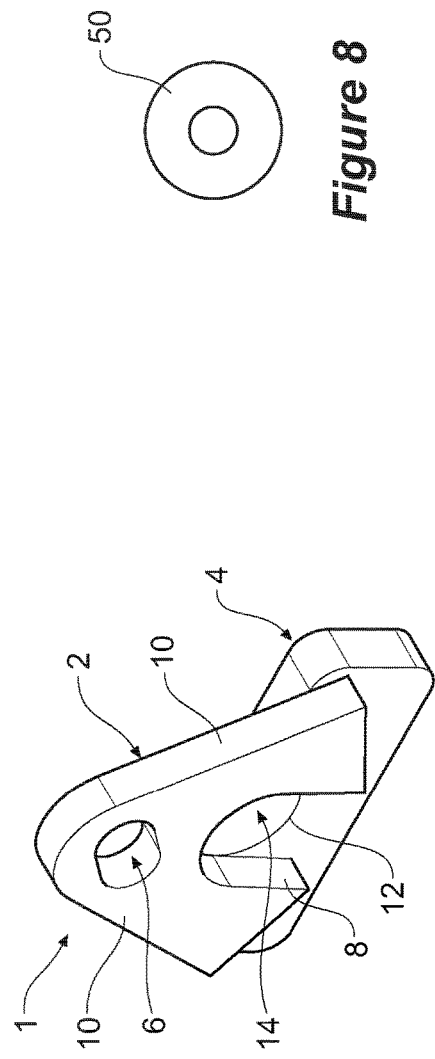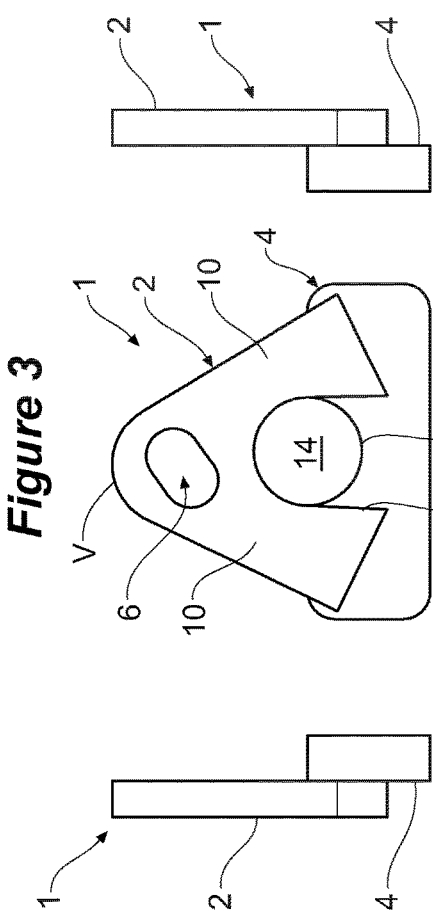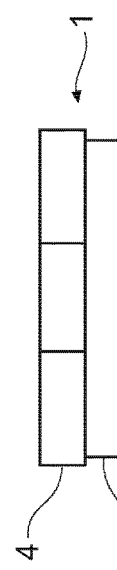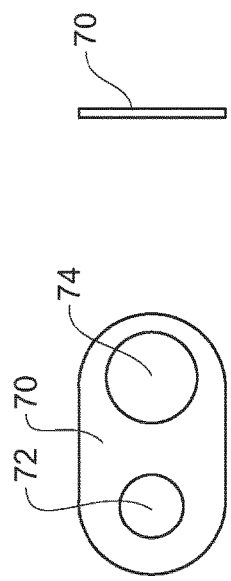

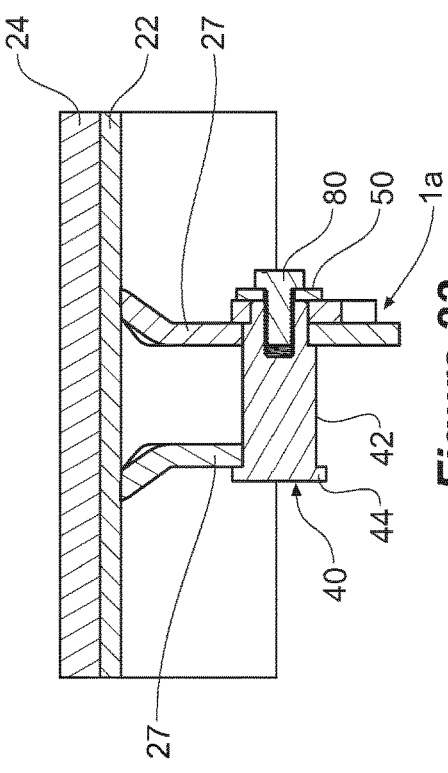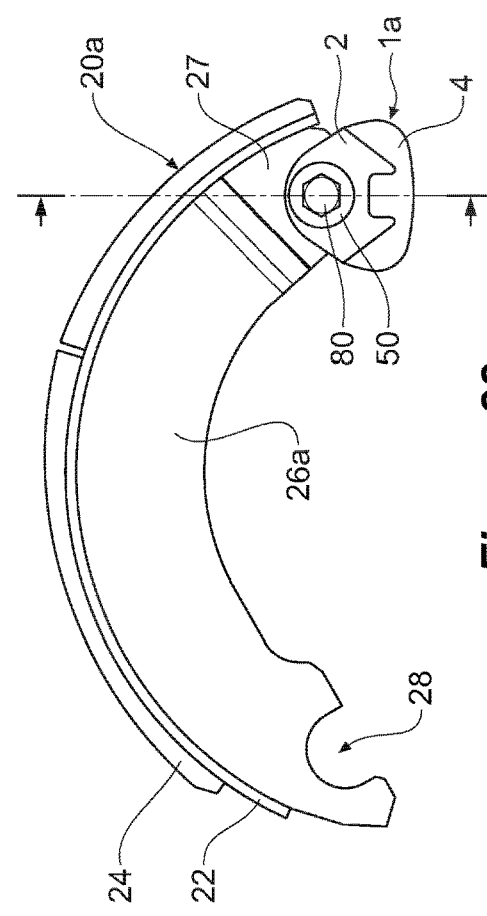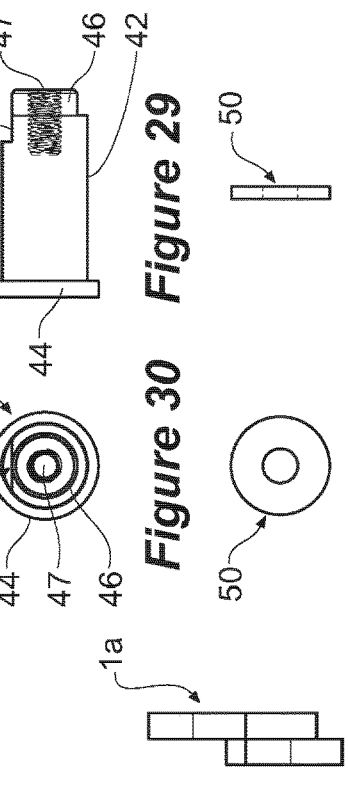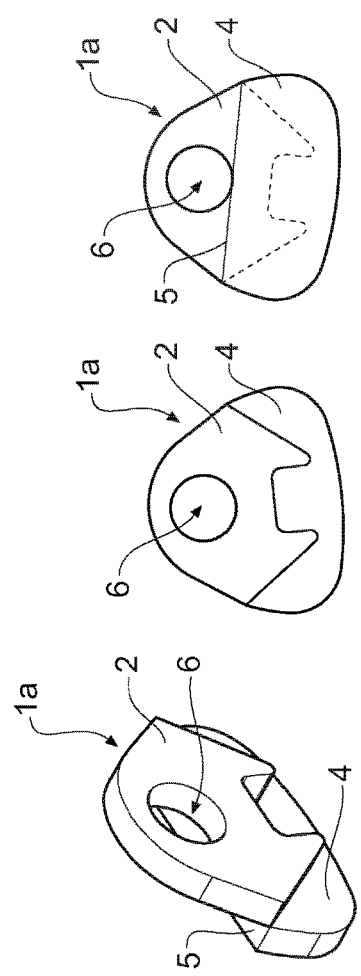

BRAKE SHOE GUIDE IMPROVEMENTS

PRIORITY DOCUMENTS

The present application claims priority from:
a. Australian Provisional Patent Application No. 2018904439 titled "BRAKE SHOE GUIDE IMPROVEMENTS" filed on 21 Nov. 2018; and
b. Australian Provisional Patent Application No. 2018904637 titled "BRAKE SHOE GUIDE IMPROVEMENTS" filed on 6 Dec. 2018;
the content of which is hereby incorporated by reference in its entirety.

INCORPORATION BY REFERENCE

The following publication is referred to in the present application and its contents are hereby incorporated by reference in their entirety:
International Patent Application No. PCT/AU2017/000239 (WO2018/094441) titled "HEAVY VEHICLE DRUM BRAKE IMPROVEMENTS" in the name of Ken Pitt.

TECHNICAL FIELD

The present disclosure relates to heavy vehicle drum brakes. In a particular form the present disclosure relates to a brake shoe guide, and an assembly comprising the brake shoe guide.

BACKGROUND

Compressed air brake systems are generally used on heavy vehicles such as trucks, and particularly those having one or more trailers which must be linked into the brake system. Reasons for this include the fact that the air brake circuits on trailers can be easily and safely attached, and the supply of air is unlimited, so that systems can never run out of their operating fluid.

Drum brakes are commonly employed on trucks and trailers, because they are considered to be more durable than disc brakes, requiring fewer lining replacements in a given period. What is more, replacement parts for drums are typically cheaper due to a larger economy of scale.

Drum brakes in compressed air brake systems are generally of a cam follower type. That is to say, at least one end of each brake shoe comprises a cam follower (a roller) which follows a generally 'S' shaped cam, which depends from a shaft rotationally driven via an air-powered brake booster, which is located outside of the wheel.

In brakes of the aforementioned type, it is known for the brake shoe to become misaligned relative to the drum when the free end of a brake shoe (i.e. the end at the S-cam) becomes laterally (usually inwardly) displaced. Misalignment of the shoes can result in reduced and low braking efficiency, high lining and drum wear resulting in reduced operational life, vehicle pull, noise generation, and even the possibility for the brake shoe to lock onto the drum when braking from high speeds, or for the brake assembly to fail completely.

International Patent Application No. PCT/AU2017/000239 (WO2018/094441) contemplates a brake shoe comprising a guide, which prevents brake shoe misalignment, and a guide for attachment to a brake shoe, which prevents brake shoe misalignment.

However, it would be advantageous to be able to easily retrofit such a guide to a brake shoe.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect, there is provided a brake shoe guide which is adapted for retrofit to a drum brake shoe, to prevent brake shoe misalignment.

According to a further aspect, there is provided a brake shoe guide for attachment to a drum brake shoe by a pin fastener, to prevent brake shoe misalignment.

According to a further aspect, there is provided a brake shoe guide assembly comprising at least a brake shoe guide and a pin fastener for securing the brake shoe guide to a drum brake shoe.

In one form, the brake shoe guide assembly retains a cam follower (or roller). In this way, the need for a roller retainer clip is eliminated.

According to a further aspect, there is provided a drum brake assembly comprising at least one drum brake shoe comprising the brake shoe guide assembly described herein.

In one form, the drum brake assembly comprises a stationary carrier upon which a brake shoe is pivotally mounted, the brake shoe comprising a pair of spaced webs, an actuating cam for the brake shoe, a cam follower interposed between the webs and the actuating cam, a rotatably mounted drum brake against which the brake shoe acts, and a brake shoe guide secured by a pin fastener to at least an outboard web in front of, and in sliding contact with, an outboard face of the actuating cam.

In one form, the drum brake assembly comprises a pair of oppositely directed brake shoes pivotally mounted to act against the drum brake.

In one form, the brake shoes are mounted at one end thereof each upon fixed pivots, with the other ends of the brake shoes carrying the cam followers and receiving the actuating cam between the respective cam followers, by which said other ends of the brake shoes are forced away from each other by the actuating cam, and into contact with the drum brake.

In one form, in an alternative, the fixed pivots for the brake shoes are replaced by a further actuating cam arrangement.

In one form, the actuating cam is an S-cam.

In one form, the or each cam follower is a roller.

According to a further aspect, there is provided a brake shoe guide for a brake shoe of a drum brake assembly, the brake shoe comprising a lining table supporting a brake lining, and at least one web comprising a mount for a follower for an actuating cam, the brake shoe guide comprising an arm portion and a bearing portion depending from the arm portion, the arm portion comprising an aperture for a pin fastener and extending from this aperture to the bearing portion, wherein in use, the guide is secured with respect to said at least one web of the brake shoe by the pin fastener through the pin aperture, with the bearing portion bearing against the actuating cam.

That is to say, the bearing portion extends in front of, and is in sliding contact with, an outboard face of the actuating cam.

In one form, at least one web of the brake shoe comprises an aperture for a roller retainer clip, which will instead receive the pin fastener for the brake shoe guide.

In one form, each web of the brake shoe comprises an aperture for a roller retainer clip, which will instead receive the pin fastener for the brake shoe guide.

In one form, the pin aperture in the arm portion is elongate.

In one form, the pin aperture in the arm portion is slotted.

In one form, the arm portion of the brake shoe guide comprises at least one arm bridging the pin fastener and the bearing portion.

In one form, the arm portion of the brake shoe guide comprises a pair of arms bridging the pin fastener and the bearing portion.

In one form, a U-shaped cut-out extends between these arms, which diverge as they extend to the bearing portion, and converge at a vertex of the arm portion.

In one form, the pin aperture is positioned near the vertex of the arm portion.

In one form, the arm portion and the bearing portion both comprise a plate.

In one form, the plates are metal.

In one form, the bearing portion plate comprises a generally rectangular shaped planform with a pair of elongate edges, where one of these elongate edges comprises a semi-circular shaped cut-out positioned approximately midway there along.

In one form, the respective cut-outs in the arm portion and the bearing portion cooperatively define a substantially circular aperture through the brake shoe guide.

In one form, the bearing portion comprises a straight edge which forms a tangent with the pin aperture.

According to a further aspect, there is provided a brake shoe guide assembly for a brake shoe of a drum brake assembly, the brake shoe comprising a lining table supporting a brake lining, and at least one web comprising a mount for a follower for an actuating cam, the brake shoe guide assembly comprising a pin fastener and a brake shoe guide comprising an arm portion and a bearing portion depending from the arm portion, the arm portion comprising an aperture through which the pin fastener passes, and extending from this aperture to the bearing portion, wherein in use, the guide is secured with respect to said at least one web of the brake shoe by the pin fastener with the bearing portion bearing against the actuating cam.

In one form, at least one web of the brake shoe comprises an aperture for a roller retainer clip, which receives the pin fastener for the brake shoe guide.

In one form, each web of the brake shoe comprises an aperture for a roller retainer clip, which receives the pin fastener for the brake shoe guide.

In one form, the brake shoe guide assembly further comprises a spacer tube of such a length as to fit between the webs of the brake shoe, and through which the pin fastener is passed, when in use.

In one form, the brake shoe guide assembly further comprises a washer against which a nut for a threaded bolt pin fastener is tightened, when in use.

In one form, the nut and washer bear against the brake shoe guide, and sandwich it between the washer and the outboard web of the brake shoe.

In one form, the assembly further comprises a holder plate comprising a first aperture for the pin fastener and a second aperture for the cam follower, when in use.

In one form, the holder plate is positioned between each of the spacer tube and cam follower, and the inboard web of the brake shoe.

In one form, the cam follower is cooperatively retained by the two webs of the brake shoe, the brake shoe guide at one end of the cam follower, and the holder plate at its other end.

In one form, the arm portion and the bearing portion are welded together.

In an alternative, the brake shoe guide is integrally formed, such as by casting or additive manufacturing.

In one form, the plate of the bearing portion is thicker than the web of the brake shoe.

In one form, the pin fastener comprises a bolt.

In one form, in an alternative, the pin fastener comprises a clevis pin, or a dowel pin or a taper pin.

In one form, the pin fastener is adapted to function as an axle for the cam follower.

In one form, the pin fastener comprises a disc-shaped flange at one end, and an insertion portion at a distal end, the insertion portion comprising a diameter which is stepped down from a diameter of a remainder of the pin fastener so as to form a shoulder.

In one form, the brake shoe guide assembly further comprises a bolt, and the stepped down end of the pin fastener comprises a threaded blind hole for receiving a shank of the bolt.

In one form, one side of the shoulder comprises a flat of such a depth as to be flush with an edge of the insertion portion of the pin fastener.

In a further aspect, there is provided a brake shoe assembly comprising a drum brake shoe and a brake shoe guide assembly comprising a brake shoe guide and a pin fastener, the brake shoe comprising a lining table supporting a brake lining, and a pair of parallel webs, each comprising a mount for a roller cam follower and an aperture for a roller retainer clip, the brake shoe guide comprising an arm portion and a bearing portion depending from the arm portion, the arm portion comprising an aperture receiving the pin fastener and extending from this aperture to the bearing portion, the roller retainer clip apertures also receiving the pin fastener so that the guide is secured with respect to the webs of the brake shoe with the bearing portion bearing against the cam.

In a further aspect, there is provided a brake shoe assembly comprising a drum brake shoe and a brake shoe guide assembly comprising at least a brake shoe guide and a pin fastener, the brake shoe comprising a lining table supporting a brake lining, and a pair of parallel webs, each comprising a mount for a roller cam follower, the brake shoe guide comprising an arm portion and a bearing portion depending from the arm portion, the arm portion comprising an aperture receiving the pin fastener and extending from this aperture to the bearing portion, the roller mounts also receiving the pin fastener so that the pin fastener serves as an axle for the roller guide while also securing the guide with respect to the webs of the brake shoe with the bearing portion bearing against the cam.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein:

FIG. 3 is an isometric perspective view of a brake shoe guide from the assembly of FIG. 1;

FIG. 4 is a front view of the brake shoe guide of FIG. 3;

FIG. 5 is a bottom view of the brake shoe guide of FIG. 3;

FIGS. 6 and 7 are side views of the brake shoe guide of FIG. 3;

FIG. 8 is a front view of a washer from the assembly of FIG. 1;

FIG. 9 is an end view of a spacer from the assembly of FIG. 1;

FIG. 10 is a side view of the spacer of FIG. 9;

FIG. 11 is a front view of a holder plate from the assembly of FIG. 1;

FIG. 12 is a side view of the holder plate of FIG. 11;

FIG. 22 is a side view of a brake shoe from the assembly of FIG. 17;

FIG. 23 is a cross-sectional view taken through the brake shoe of FIG. 22, taken at E-E;

FIG. 24 is an isometric perspective view of a brake shoe guide from the assembly of FIG. 17;

FIG. 25 is a front view of the brake shoe guide of FIG. 24;

FIG. 26 is a rear view of the brake shoe guide of FIG. 24;

FIG. 27 is an end view of the brake shoe guide of FIG. 24;

FIG. 28 is a top view of the brake shoe guide of FIG. 24;

FIG. 29 is side view of a pin from the assembly of FIG. 17;

FIG. 30 is an end view of the pin of FIG. 29;

FIG. 31 is a front view of a washer from the assembly of FIG. 17;

FIG. 32 is an end view of the washer of FIG. 31; and

FIG. 33 is a side view of a bolt from the assembly of FIG. 17.

In the following description, like reference characters designate like or corresponding parts throughout the figures.

DESCRIPTION OF EMBODIMENTS

Figure 1:
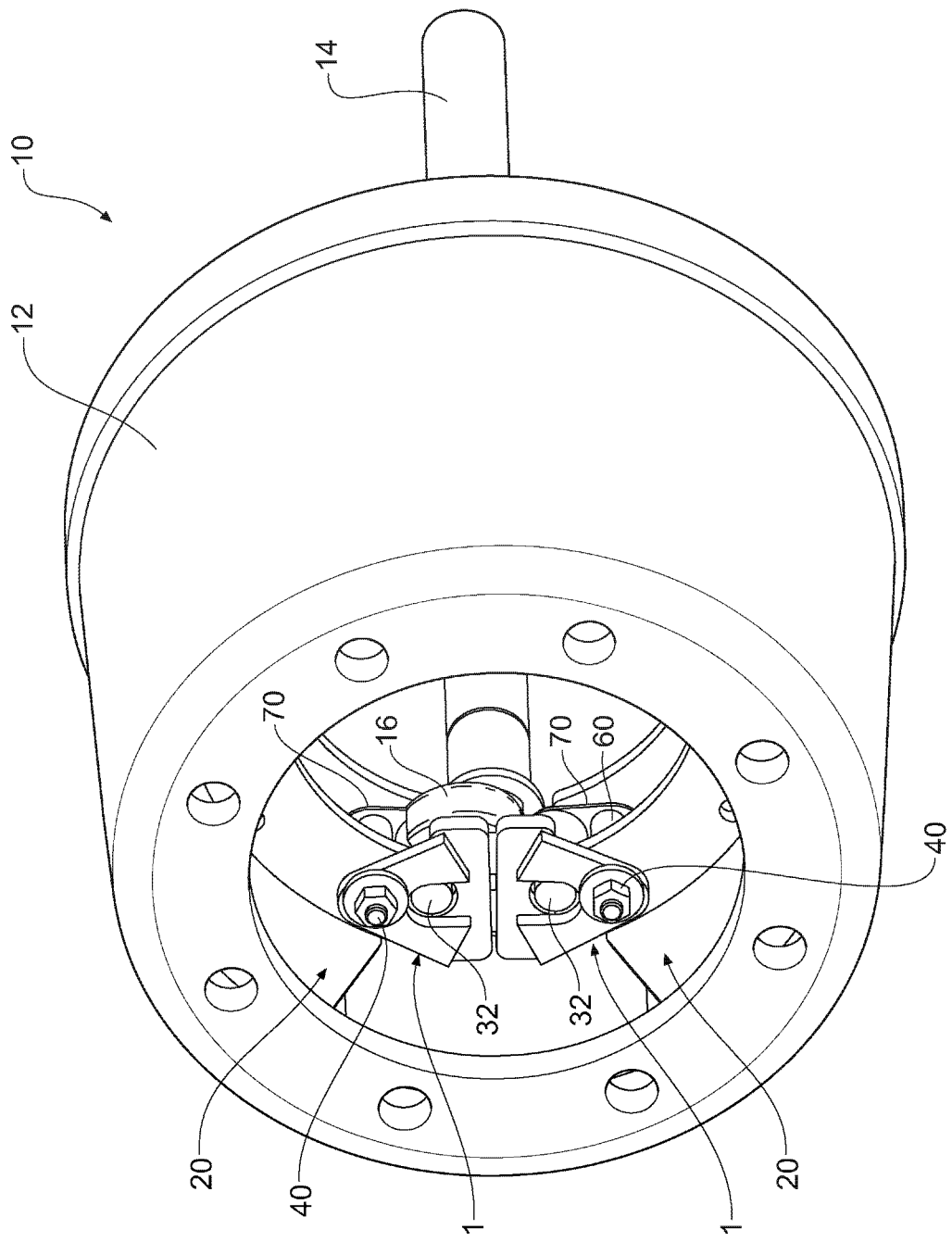
FIG. 1 is an isometric perspective view of a portion of a drum brake assembly for a vehicle.

Referring now to FIG. 1, there is shown a typical drum brake assembly 10 from a compressed air brake system of a heavy vehicle such as a semi-trailer prime mover or trailer.

The drum brake assembly 10 comprises a stationary carrier (not illustrated) upon which a pair of arcuate brake shoe assemblies 20 are pivotally mounted in an oppositely directed arrangement, for enclosure within and cooperation with a cylindrical internal surface of a rotatably mounted drum brake 12, to which a wheel assembly of the vehicle is attached.

With reference to FIGS. 2 through 5, it can be seen that each of the brake shoe assemblies (or brake shoes) comprises a lining table 22 having a working face and a backing face, where a brake lining 24 depends from the working face, and a pair of parallel, spaced apart webs 26 depend from the backing face.

Each web 26 of a given brake shoe assembly 20 comprises one of a pair of mutually aligned anchor pin holes 28, via which that brake shoe assembly 20 is pivotally attached to the stationary carrier. Each web 26 of that brake shoe assembly 20 further comprises, at an end distal to the anchor pin holes 28 (i.e. the free end), one of a pair of mutually aligned generally U-shaped cam follower mounts 30, for mounting opposite ends of a cam follower (or roller) 32 in the form of a roller retained therein by retaining clips (not illustrated).

Referring once more to FIG. 1, the drum brake assembly 10 further comprises a shaft 14 extending from an air-powered brake booster (not illustrated, but typically depending from an axle housing for the wheels) into the drum brake 12, where it terminates at an S-shaped actuating cam (hereinafter S-cam) 16 which interposes the cam follower rollers 32.

In use, when the brake pedal of the vehicle is pushed, compressed air is supplied to the air-powered brake booster, which rotates the S-cam 16 via a push rod, a slack adjuster (i.e. a lever—not shown) and then the shaft 14, driving the brake shoes 20 outward into contact with the drum brake 12.

From an outboard (when in use) web 26 of each brake shoe assembly 20 there depends and extends a brake shoe guide 1, which forms a part of a brake shoe guide assembly.

With reference to FIGS. 3 through 7, it can be seen that the brake shoe guide 1 comprises an arm portion 2 comprising an aperture 6 for a pin fastener, and a bearing portion 4 depending from the arm portion 2.

The arm portion 2 and the bearing portion 4 both comprise a steel plate, and these are welded together to form the guide 1. In an alternative, the guide 1 could be integrally formed such as by casting or additive manufacturing.

The arm portion 2 plate comprises a generally sector shaped planform, one edge of which comprises a generally U-shape cut-out 8, which separates two arms 10 of the arm portion 2. Opposing the edge with the cut-out 8 is a vertex V of the arm portion 2, at which the arms 10 converge. Between the vertex V and the cut-out 8 is the aperture 6 for the pin fastener (hereinafter pin aperture 6).

The pin aperture 6 is slotted, the reason for this will be explained below.

The bearing portion 4 plate comprises a generally rectangular shaped planform with a pair of elongate edges. One of these elongate edges comprises a semi-circular shaped cut-out 12 positioned approximately midway there along.

The arm portion 2 is secured (by welding in this case) to the bearing portion 4 so that distal ends of the two arms 10 will overlap (overlay) the bearing portion 4, and the two arms 10 will straddle the semi-circular shaped cut-out 8, so that the respective cut-outs 8 and 12 in the arm portion 2 and the bearing portion cooperatively define a substantially circular aperture 14 through the brake shoe guide 1.

The brake shoe guide 1 is fitted to the brake shoe 20 as a part of a brake shoe guide assembly.

With reference to FIGS. 8 through 12, it can be seen that the brake shoe guide assembly further comprises the pin fastener 40 (namely a bolt 42 with a nut 44 in this embodiment), a washer 50 (as illustrated in FIG. 8), a tubular pipe spacer 60 (as illustrated in FIGS. 9 and 10), and a holder plate 70 comprising a first aperture 72 for the pin fastener and a second aperture 74 for the cam roller, when in use.

Each of the webs 26 of the brake shoe 20 comprises an aligned hole 28, where this pair of aligned holes 28 is normally provided for a roller retainer clip, which extends between the holes and retains a cam follower roller 32 between the webs 26.

In use, a shank of the bolt 42 is passed through the hole 28 in the inboard web 26 of the brake shoe 20, through the pin aperture 72 in the holder plate 70, through the pipe spacer 60, through the hole 28 in the outboard web 26 of the brake shoe 20, through the pin aperture 6 in the guide 1, through the washer 50, and is then secured with the nut 44.

In use, the roller 32 is retained at one end by an aperture cooperatively formed between cut-out 12 in the guide 1 and the U-shaped cam follower mounts 30 in the webs 26, and at the second end by the second aperture 74 in the holder plate 70, usefully eliminating the need for a roller retainer clip.

The bearing plate 4 of the fitted guide 1 will bear against the outboard exterior surface of the S-cam, thereby preventing the brake shoe 20 from becoming misaligned with respect to the drum 12.

Figure 15:
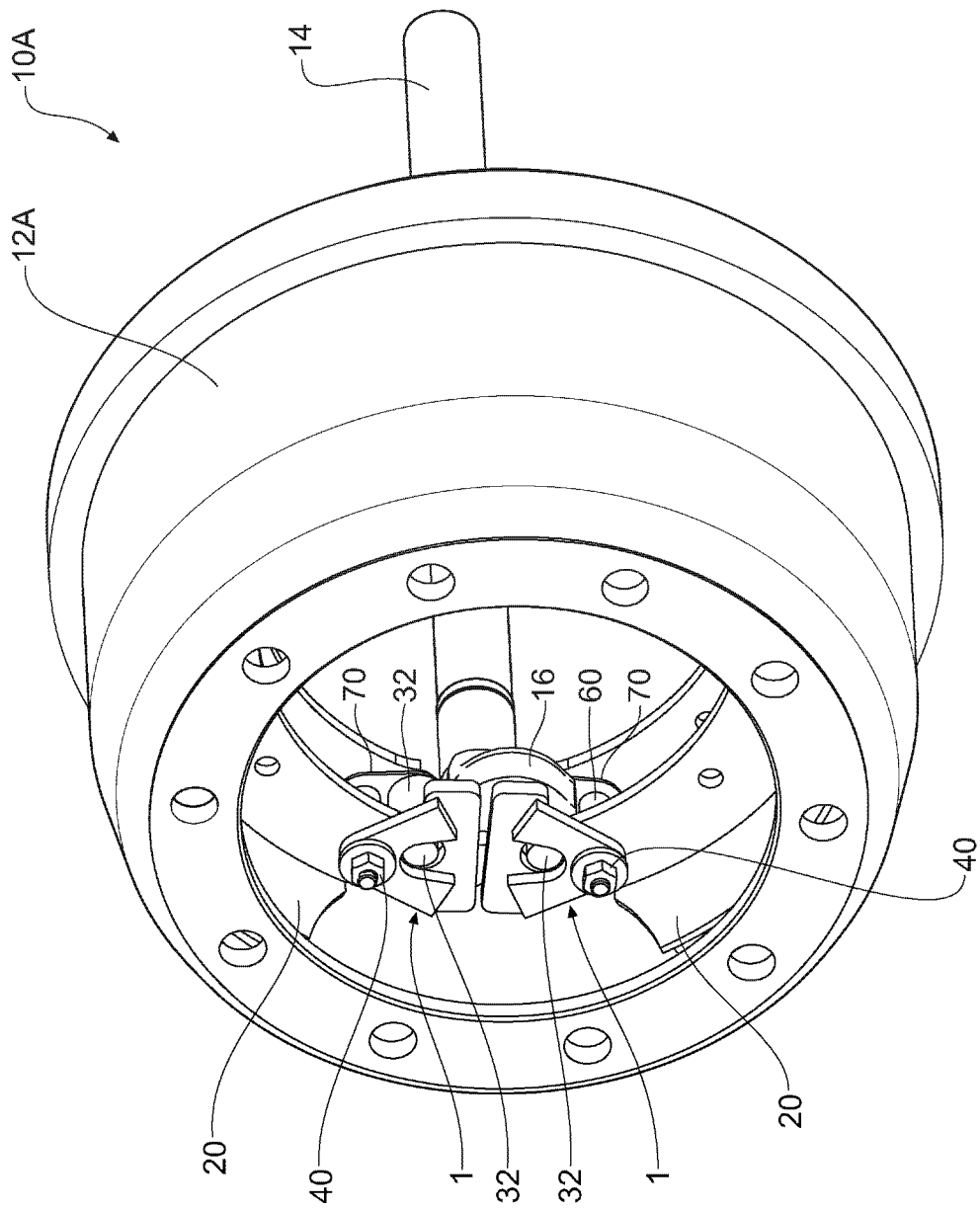
FIG. 15 is an isometric perspective view of a portion of a drum brake assembly for a vehicle, according to a further embodiment, where the drum is larger.
Figure 16:
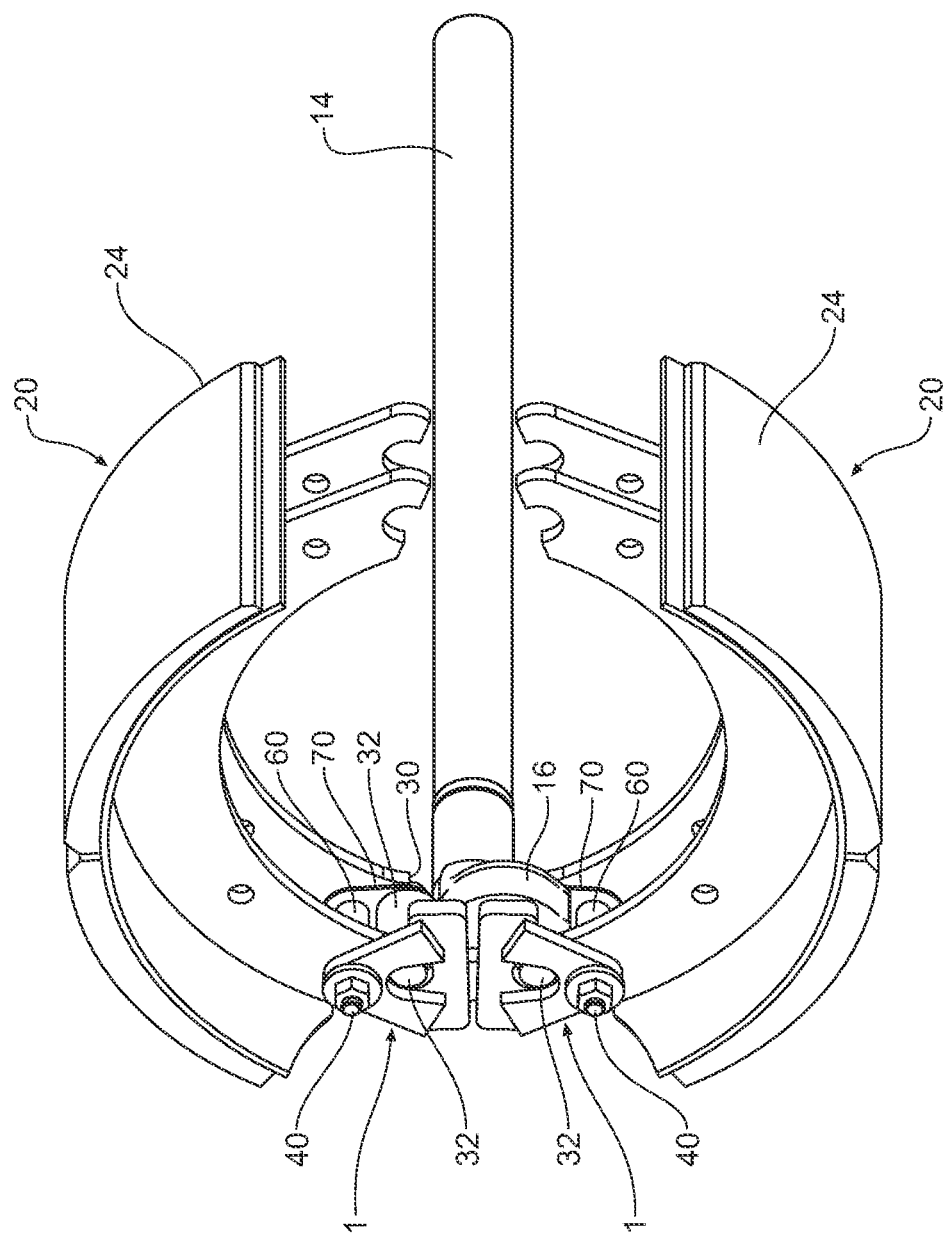
FIG. 16 is an isometric perspective view of the portion of a drum brake assembly of FIG. 15, minus the drum, which is removed to provide improved visibility of internals.
Figure 17:
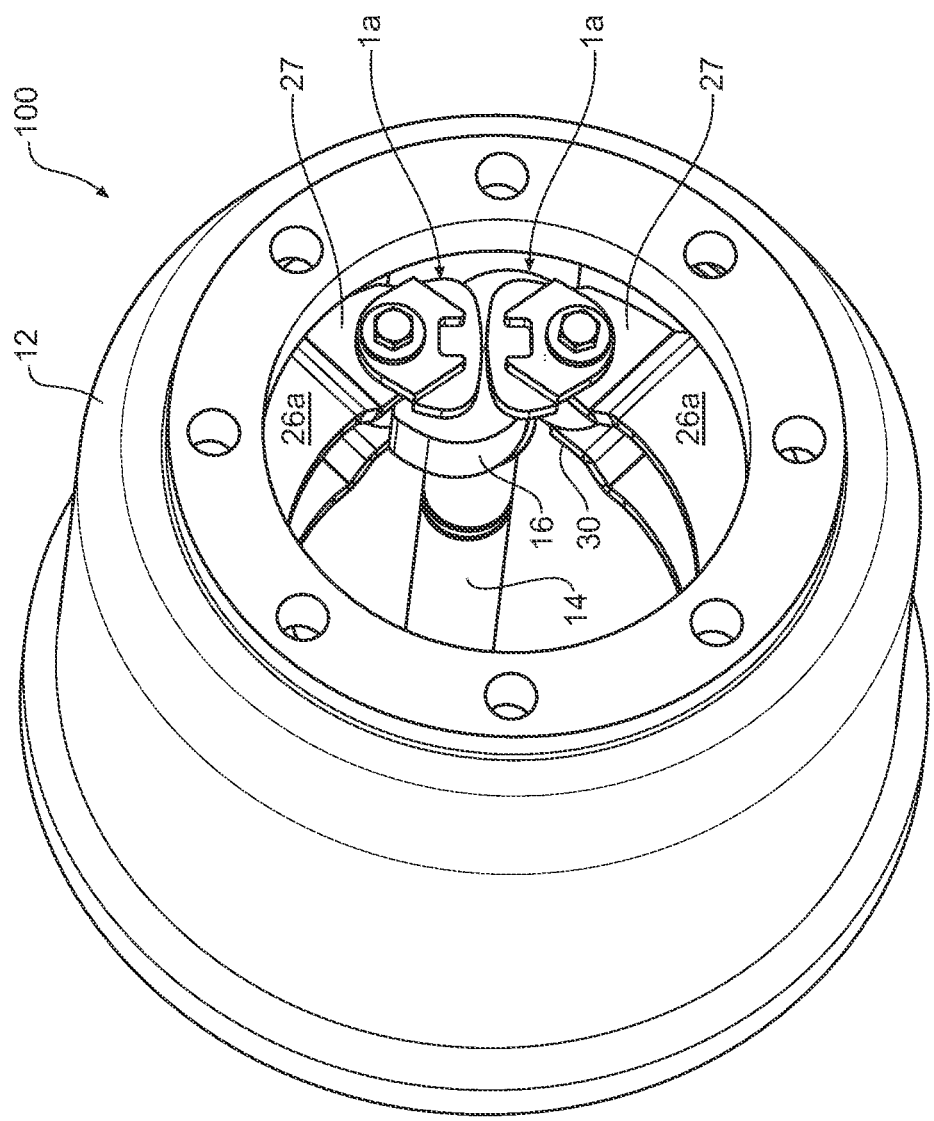
FIG. 17 is an isometric perspective view of a portion of a drum brake assembly for a vehicle, according to yet a further embodiment.
Figure 18:
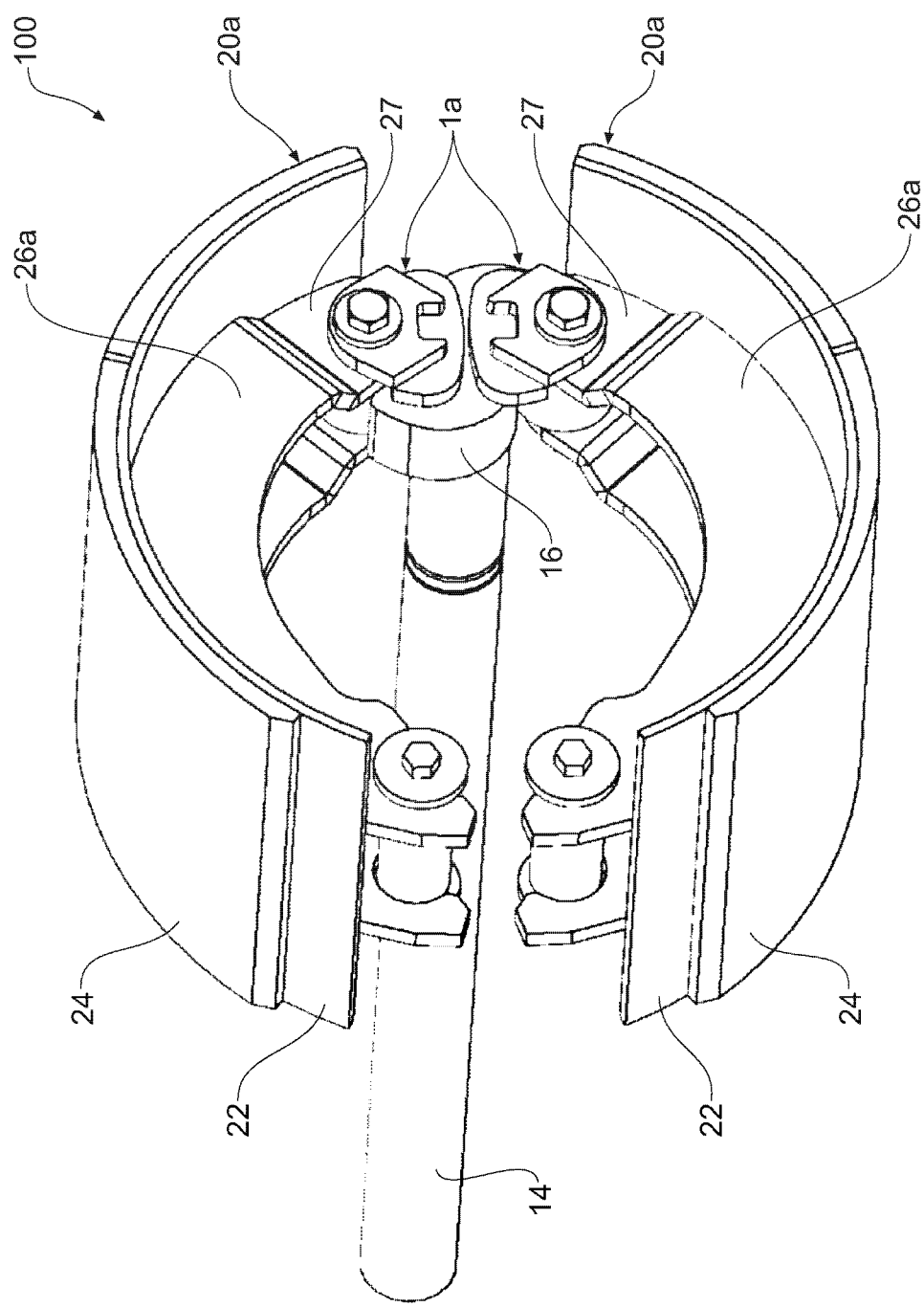
FIGS. 18 and 19 are isometric perspective views of the portion of the drum brake assembly of FIG. 17, minus the drum, which is removed to provide improved visibility of internals.
Figure 19:
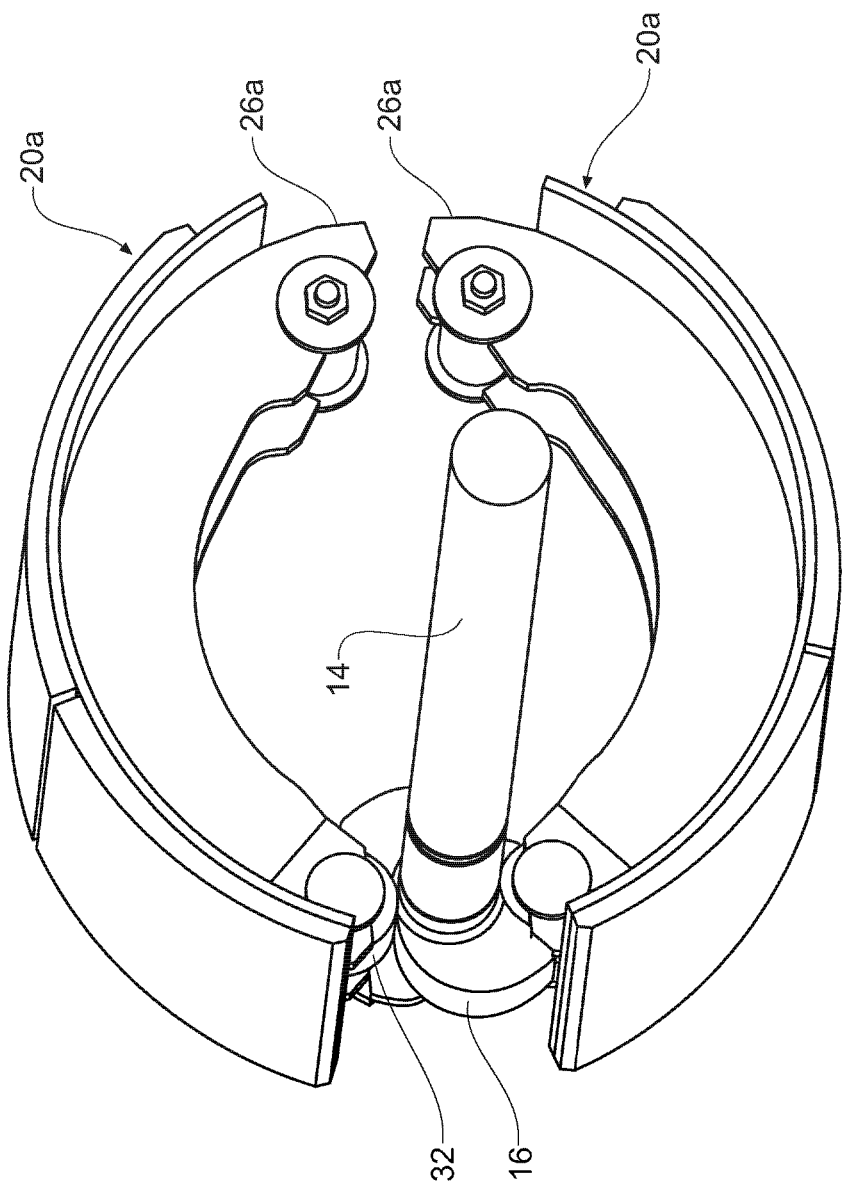
Figure 20:
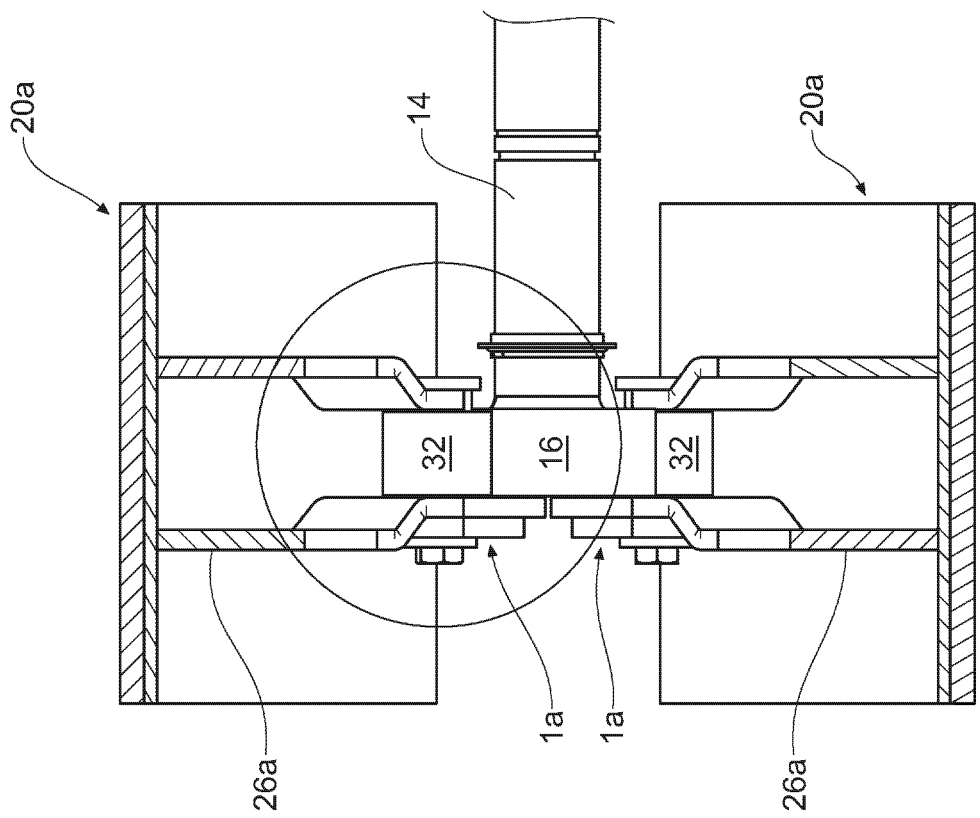
FIG. 20 is a cross-sectional view through the assembly of FIG. 17, illustrating two (2) brake shoe guide assemblies in detail.
Figure 21:
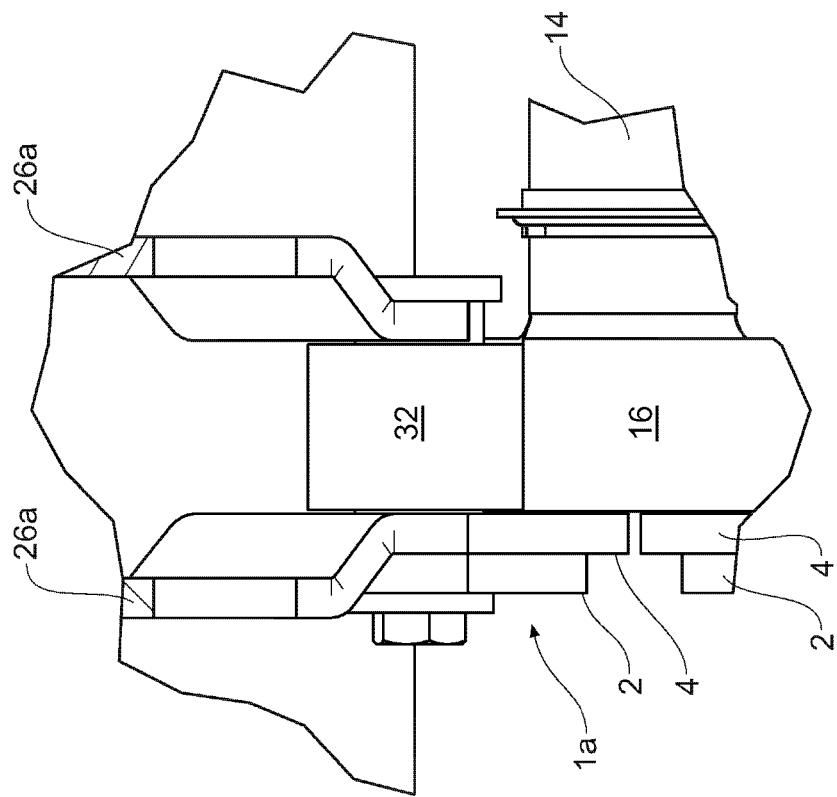
FIG. 21 is a detail view taken at D in FIG. 20, illustrating one of the brake shoe guide assemblies in detail.

Referring now to FIGS. 15 and 16, where there is illustrated a portion of a drum brake assembly 10a for a vehicle, according to a further embodiment, where the drum 12a is larger than drum 12 of FIG. 1, and the brake shoes 20 are intended to be driven by a further S-cam (not illustrated). Otherwise, those parts of drum brake assembly 10a which are identical to those of assembly 10 of FIGS. 1 and 2, will be denoted by the same reference numbers, and will not be described in detail again here.

The slotted pin aperture 6 in the guide 1 permits the brake shoe guide 1 and the assembly of which it forms a part, to be used with both the drum 12a of this embodiment, and that of the embodiment illustrated in FIG. 1.

Figure 2:
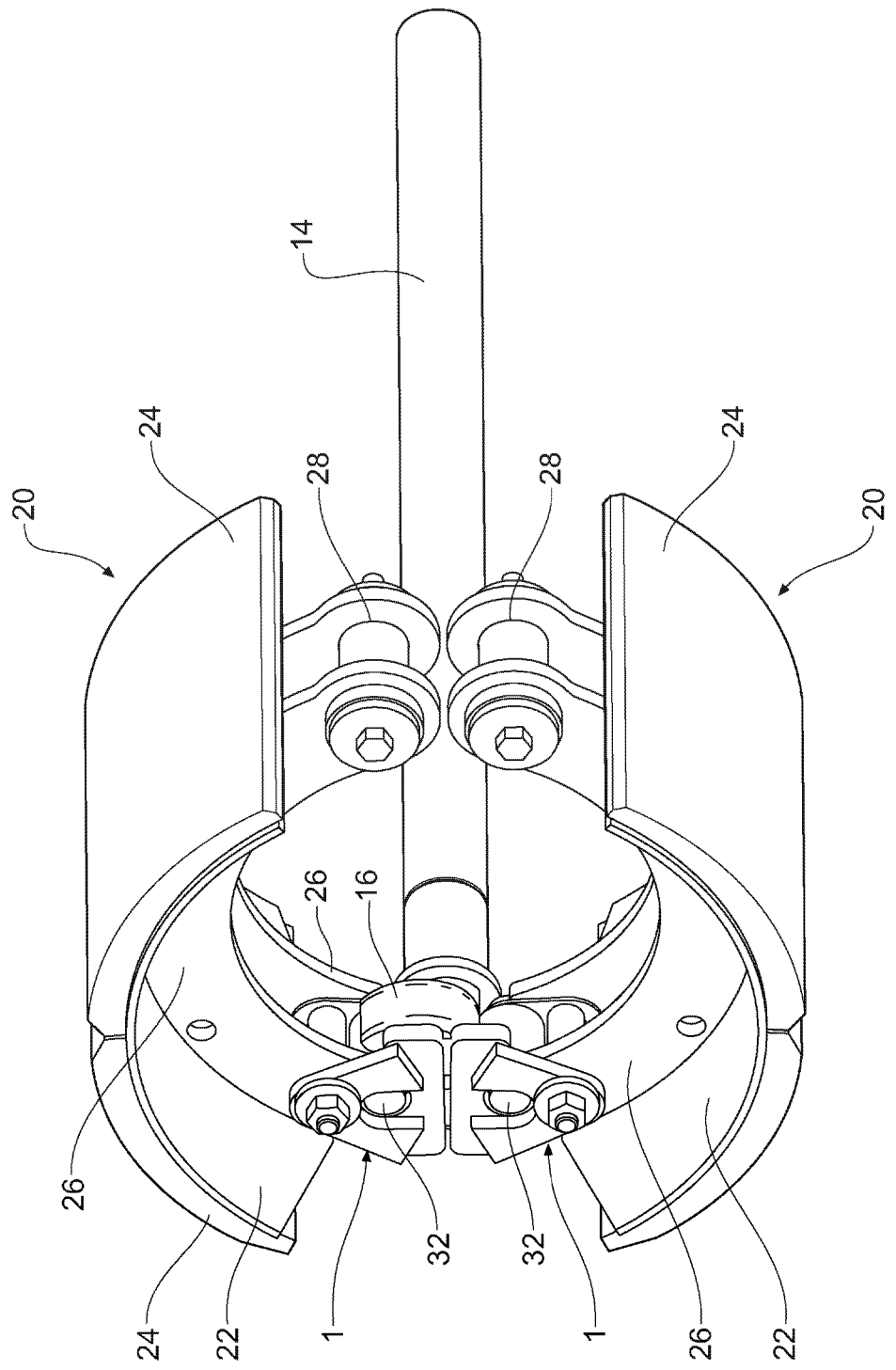
FIG. 2 is an isometric perspective view of the portion of a drum brake assembly of FIG. 1, minus the drum, which is removed to provide improved visibility of internals.
Figure 13:
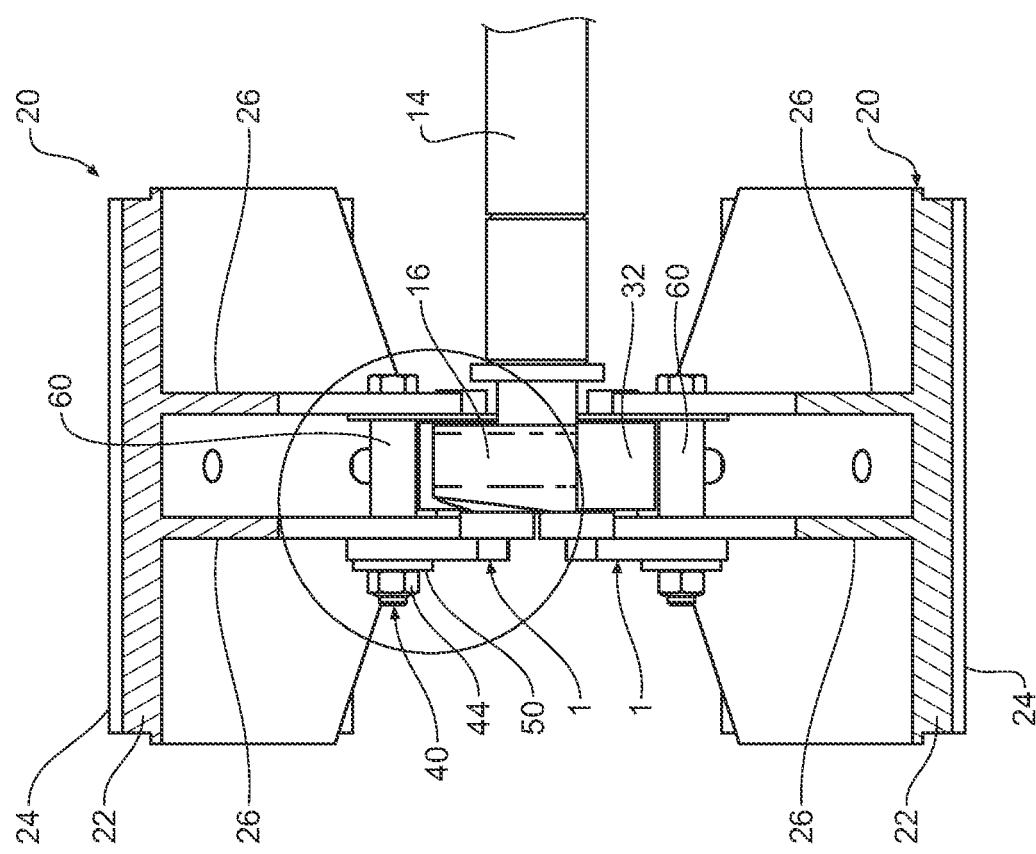
FIG. 13 is a cross-sectional view through the assembly of FIG. 1, illustrating two (2) brake shoe guide assemblies in detail.
Figure 14:
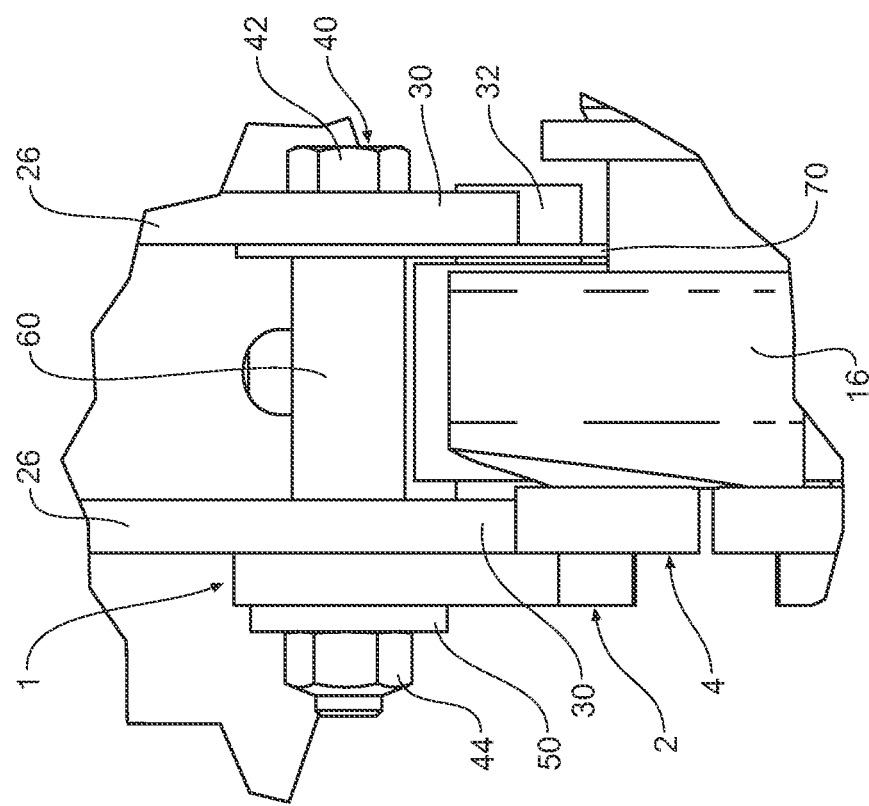
FIG. 14 is a detail view taken at B in FIG. 13, illustrating one of the brake shoe guide assemblies in detail.

Referring now to FIGS. 17 through 33, where there is illustrated a portion of a drum brake assembly 100 for a vehicle, according to a further embodiment, those parts of drum brake assembly 100 which are identical to those of assembly 10 of FIGS. 1 and 2 will be denoted by the same reference numbers, and will not be described in detail again here.

The brake shoe assemblies 20a of brake assembly 100 comprise webs 26a which converge toward each other before terminating in parallel portions 27 comprising mounting apertures 28 for the cam follower 32. In this embodiment, the apertures 28 in the webs 26a are generally U-shaped, and the webs 26a comprise a straight edge to either side of the apertures 28.

In this embodiment, the brake shoe guide 1a is shaped differently to the brake shoe guide 1, but is structurally similar in that it similarly comprises an arm portion 2 comprising an aperture 6 for a pin fastener 40, and a bearing portion 4 depending from the arm portion 2. A salient feature of brake shoe guide 1a is that the bearing portion 4 comprises a straight edge 5 which, in the assembled brake shoe guide 1a, forms a tangent with the aperture 6. The purpose for this will be discussed below.

The brake shoe guide 1a is fitted to the brake shoe 20a as a part of a brake shoe guide assembly.

With reference to FIGS. 23, and 29 through 33, it can be seen that the brake shoe guide assembly comprises the pin fastener 40 (namely a pin) a washer 50, and a bolt 80.

The pin 40 comprises a generally elongate cylindrical body 42, comprising a disc-shaped flange 44 at one end, and an insertion portion 46 at a second end, the insertion portion 46 comprising a diameter which is stepped down from a diameter of a remainder of the body 42 of the pin 40. The end of the insertion portion 46 comprises a threaded blind hole 47 for receiving a shank of the bolt 80. A shoulder 48 is formed where the insertion portion 46 meets the remainder of the body 42 of the pin 40. On one side of the pin 40 the shoulder 48 comprises a flat 49; this flat 49 is of such a depth as to be flush with an edge of the insertion portion 46.

In use, the pin 40 is passed through a cam follower (roller) 32 and between the apertures 28 in the inboard and outboard webs 26a of the brake shoe with the flange 44 locating against an inboard side of the inboard web. That is to say, in this embodiment, the pin fastener 40 usefully doubles as an axle for the cam follower (roller) 32.

The insertion portion 46 of the pin 40 is inserted into the aperture 6 in the brake shoe guide 1a with both the flat 49 on the pin 40, and the straight edge on the outboard web 26a registering against the straight edge 5 of the bearing portion 4 of the brake shoe guide 1a. This ensures correct assembly and positioning of these components, prevents incorrect assembly, prevents components from moving as they wear, and reduces wear.

The shank of the bolt 80 is then passed through the washer 50 and screwed into the threaded blind hole 47 in the end of the insertion portion 46, so as to secure both the brake shoe guide 1a and the pin 40 with respect to the brake shoe assembly 20a.

Advantageously, the brake shoe guide described herein is simple to fit to a standard, off the shelf brake shoe, and is in this regard, retrofitable to a brake shoe and/or brake assembly. Moreover, where the brake shoe guide forms part of the brake shoe guide assembly described herein, the assembly can retain the cam follower roller to the brake shoe, and even act as an axle for the cam follower roller, eliminating the need for a separate retainer clip. Further still, the guide and the assembly of which it forms a part can be used with drums of various sizes.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A brake shoe guide for a brake shoe of a drum brake assembly, the brake shoe having a lining table supporting a brake lining and at least one web comprising a mount for a follower for an actuating cam, the brake shoe guide comprising:
   an arm portion and a bearing portion,
   wherein the arm portion overlays at least a portion of the bearing portion, and the bearing portion depends from the arm portion, the arm portion comprising an aperture for a pin fastener and extending from the aperture to the bearing portion, wherein the arm portion comprises a pair of arms bridging the pin fastener aperture and the bearing portion, wherein the arms diverge as they extend to the bearing portion and converge at a vertex of the arm portion, and wherein the pin aperture is positioned near the vertex of the arms,
   wherein the bearing portion comprises a generally rectangular shaped planform with a pair of elongate edges, one of the elongate edges comprising a semi-circular shaped cut-out positioned approximately midway there along, and
   wherein in use, the brake shoe guide is removably secured with respect to the at least one web of the brake shoe by the pin fastener through the pin aperture in the arm portion, with the bearing portion bearing against the actuating cam.

2. The brake shoe guide of claim 1, wherein the arm portion and the bearing portion both comprise a plate.

3. The brake shoe guide of claim 1, wherein the pin aperture is elongate.

4. The brake shoe guide of claim 1, wherein the pin aperture is slotted.

5. The brake shoe guide of claim 1, wherein a U-shaped cut-out extends between the arms.

6. The brake shoe guide of claim 1, wherein the arm portion and the bearing portion cooperatively define a substantially circular aperture through the brake shoe guide.

7. The brake shoe guide of claim 1, wherein the bearing portion comprises a straight edge which forms a tangent with the pin aperture.

8. A brake shoe guide assembly for a brake shoe of a drum brake assembly, the brake shoe comprising a lining table supporting a brake lining, and at least one web comprising a mount for a cam follower for an actuating cam, the brake shoe guide assembly comprising:
   a pin fastener; and
   a brake shoe guide comprising an arm portion and a bearing portion,
   wherein the arm portion overlays at least a portion of the bearing portion, and the bearing portion depends from the arm portion, the arm portion comprising a pin aperture through which the pin fastener passes, and extending from the pin aperture to the bearing portion,
   wherein the at least one web comprises two webs, the brake shoe guide further comprising:
   a spacer tube of such a length as to fit between the two webs of the brake shoe, and through which the pin fastener is passed, when in use; and
   a holder plate comprising a first aperture for the pin fastener and a second aperture for the cam follower, when in use, and
   wherein, when in use, the brake shoe guide is removably secured with respect to the at least one web of the brake shoe by the pin fastener through the pin aperture in the arm portion, the arm portion extending along an outer side of the at least one web with the bearing portion bearing against the actuating cam.

9. The brake shoe guide assembly of claim 8, wherein the assembly is adapted to retain the cam follower with respect to the brake shoe.

10. The brake shoe guide assembly of claim 8, wherein the pin fastener is threaded, and wherein the assembly further comprises a washer against which a nut for the threaded pin fastener is tightened, when in use.

11. The brake shoe guide assembly of claim 10, wherein, when in use, the nut and washer bear against the arm portion of the brake shoe guide, and sandwich the arm portion between the washer and an outboard web of the brake shoe.

12. The brake shoe guide assembly of claim 8, wherein, when in use, the holder plate is positioned between each of the spacer tube and cam follower, and an inboard web of the two webs of the brake shoe.

13. The brake shoe guide assembly of claim 12, wherein, when in use, the cam follower is cooperatively retained by the two webs of the brake shoe, the brake shoe guide at one end of the cam follower, and the holder plate at the other end of the cam follower.

14. The brake shoe guide assembly of claim 8, wherein the pin fastener is adapted to function as an axle for the cam follower.

15. The brake shoe guide assembly of claim 14, wherein the pin fastener comprises a disc-shaped flange at one end, and an insertion portion at a distal end, the insertion portion comprising a diameter which is stepped down from a diameter of a remainder of the pin fastener so as to form a shoulder.

16. The brake shoe guide assembly of claim 15, further comprising a bolt, and wherein the stepped down end of the pin fastener comprises a threaded blind hole for receiving a shank of the bolt.

17. The brake shoe guide assembly of claim 16, wherein one side of the shoulder comprises a flat of such a depth as to be flush with an edge of the insertion portion of the pin fastener.

18. A brake shoe assembly comprising a drum brake shoe and a brake shoe guide assembly comprising a brake shoe guide and a pin fastener, the brake shoe comprising a lining table supporting a brake lining, and a pair of parallel webs, each web comprising a mount for a roller cam follower for a cam and an aperture for a roller retainer clip, the brake shoe guide comprising an arm portion and a bearing portion, wherein the arm portion overlays at least a portion of the bearing portion, and the bearing portion depends from the arm portion, the arm portion comprising an aperture receiving the pin fastener and extending from the aperture to the bearing portion, the roller retainer clip apertures also receiving the pin fastener through the pin aperture in the arm portion, the arm portion extending along an outer side of an outer web of the pair of webs so that the guide is removably secured with respect to the outer web of the brake shoe with the bearing portion bearing against the cam.

19. A brake shoe assembly comprising a drum brake shoe and a brake shoe guide assembly comprising at least a brake shoe guide and a pin fastener, the brake shoe comprising a lining table supporting a brake lining, and a pair of parallel webs, each web comprising a mount for a roller cam follower for a cam, the brake shoe guide comprising an arm portion and a bearing portion, wherein the arm portion overlays at least a portion of the bearing portion, and the bearing portion depends from the arm portion, the arm portion comprising an aperture receiving the pin fastener and extending from the aperture to the bearing portion, the roller cam follower mounts also receiving the pin fastener through the pin aperture in the arm portion, the arm portion extending along an outer side of the outer web so that the pin fastener serves as an axle for the roller cam follower while also removably securing the guide with respect to the outer web of the brake shoe with the bearing portion bearing against the cam.

* * * * *